United States Patent [19]

Kitchin et al.

[11] Patent Number: 4,581,325

[45] Date of Patent: Apr. 8, 1986

[54] PHOTOGRAPHIC ELEMENTS INCORPORATING ANTIHALATION AND/OR ACUTANCE DYES

[75] Inventors: Jonathan P. Kitchin, Ware; Bernard A. Lea, London; Ronald W. Burrows, Harlow, all of England

[73] Assignee: Minnesota Mining and Manufacturing Company, St. Paul, Minn.

[21] Appl. No.: 693,831

[22] Filed: Jan. 23, 1985

Related U.S. Application Data

[63] Continuation of Ser. No. 522,482, Aug. 12, 1983, abandoned.

[30] Foreign Application Priority Data

Aug. 20, 1982 [GB] United Kingdom ............... 8224018

[51] Int. Cl.$^4$ .............................................. G03C 1/76
[52] U.S. Cl. .................................... 430/522; 430/523; 430/950; 430/961; 430/617
[58] Field of Search ............... 430/522, 578, 594, 523, 430/950, 961, 617

[56] References Cited

U.S. PATENT DOCUMENTS 2,955,939 10/1960 Brooker et al. ...................... 96/105
3,573,921 4/1971 Jenkins et al. ...................... 430/578
3,758,309 9/1973 Bailey et al. ......................... 430/581
3,837,863 9/1974 Sakazume et al. ................... 430/581
3,933,507 1/1976 Konig et al. ........................ 430/570
4,006,015 2/1977 Swank et al. ....................... 430/581
4,193,801 3/1980 Hopwood ........................... 430/581
4,256,819 3/1981 Webster et al. ...................... 430/41

FOREIGN PATENT DOCUMENTS 1192334 5/1970 United Kingdom .

Primary Examiner—Jack P. Brammer
Attorney, Agent, or Firm—Donald M. Sell; James A. Smith; Mark A. Litman

[57] ABSTRACT

A photographic element of the conventional wet processed type or of the dry silver type which includes an antihalation or acutance dye which absorbs in the near infrared and has a relatively low visible absorption while retaining a high extinction coefficient at $_{max}$. The dye is of the general formula:

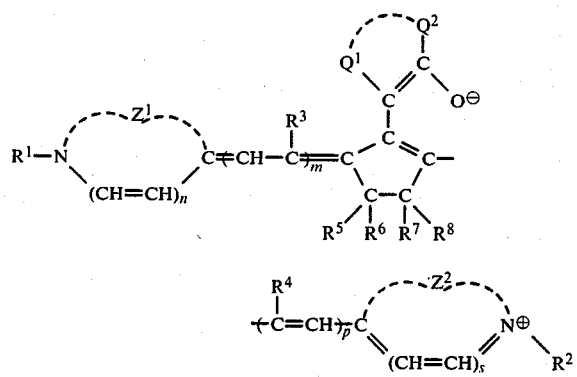

in which:
$m+p=2$,
$n$ is 0 or 1,
$s$ is 0 or 1,
$Z^1$ and $Z^2$ independently represent the non-metallic atoms necessary to complete a heterocyclic nucleus of the type present in cyanine dyes,
$R^1$ and $R^2$ independently represent an alkyl or substituted alkyl, alkenyl, substituted alkenyl or aralkyl group of up to 20 carbon atoms,
$R^3$ and $R^4$ independently represent a hydrogen atom or an alkyl, substituted alkyl, alkenyl or substituted alkenyl group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, or
one of $R^5$ and $R^6$ together with one of $R^7$ and $R^8$ represent the necessary atoms to complete a carbocyclic ring in which case the others of $R^5$ to $R^8$ are absent,
$Q^1$ and $Q^2$ together represent the non-metallic atoms necessary to complete an acidic nucleus of the type present in oxonol or merocyanine dyes.

18 Claims, No Drawings

PHOTOGRAPHIC ELEMENTS INCORPORATING ANTIHALATION AND/OR ACUTANCE DYES

This is a continuation of application Ser. No. 522,482 filed Aug. 12, 1983, now abandoned.

FIELD OF THE INVENTION

This invention relates to a photographic element incorporating an antihalation or acutance dye.

BACKGROUND OF THE INVENTION

Light sensitive recording materials may suffer from a phenomenon known as halation which causes degradation in the quality of the recorded image. Such degradation may occur when a fraction of the imaging light which strikes the photosensitive layer is not absorbed but passes through to the film base on which the photosensitive layer is coated. A portion of the light reaching the base may be reflected back to strike the photosensitive layer from the underside. Light thus reflected may, in some cases, contribute significantly to the total exposure of the photosensitive layer. Any particulate matter in the photosensitive element may cause light passing through the element to be scattered. Scattered light which is reflected from the film base will, on its second passage through the photosensitive layer, cause exposure over an area adjacent to the point of intended exposure. It is this effect which leads to image degradation. Silver halide based photographic materials (including photothermographic materials) are prone to this form of image degradation since the photosensitive layers contain light scattering particles. The effect of light scatter on image quality is well documented and is described, for example, in T. H. James "The Theory of the Photographic Process", 4th Edition, Chapter 20, Macmillan 1977.

It is common practice to minimise the effects of light scatter by including a light absorbing layer within the photographic element. To be effective the absorption of this layer must be at the same wavelengths as the sensitivity of the photosensitive layer. In the case of imaging materials coated on transparent base, a light absorbing layer is frequently coated on the reverse side of the base from the photosensitive layer. Such a coating, known as an "antihalation layer", effectively prevents reflection of any light which has passed through the photosensitive layer.

A similar effect may be achieved by a light absorbing layer interposed between the photosensitive layer and the base. This construction, described as an "antihalation underlayer" is applicable to photosensitive coatings on transparent or non-transparent bases. A light absorbing substance may be incorporated into the photosensitive layer itself, in order to absorb scattered light. Substances used for this purpose are known as "acutance dyes". It is also possible to improve image quality by coating a light absorbing layer above the photosensitive layer of a wet processed photographic element. Coatings of this kind, described in U.S. Patent Specification No. 4,312,941 prevent multiple reflections of scattered light between the internal surfaces of a photographic element.

Many substances are known which absorb visible and/or ultraviolet light, that are suitable for image improvement purposes in conventional photographic elements sensitised to wavelengths below 700 nm. Triarylmethane and oxonol dyes in particular, are used extensively in this connection. There is, however, a need for antihalation and acutance dyes which absorb in the near infrared region of the spectrum. Dyes of this type are required for recording materials which are spectrally sensitised to near infrared wavelengths, for example, materials which are designed to record the output of near infrared lasers. Coatings of infrared absorbing pigments such as carbon black may be used, however, the use of this material is objectionable since it does not decolourise during processing and must therefore be coated in a binder which dissolves in developing solution allowing the carbon black to wash off causing objectionable contamination of the developer.

The classes of organic dyes which are commonly employed for antihalation and/or acutance purposes in ultraviolet and visible light sensitive materials do not readily form stable derivatives which absorb strongly in the near infrared. References to visible light herein refer to wavelengths between 400 and 700 nm and references to near infrared light refer to wavelengths between 700 and 1400 nm.

Coatings of antihalation or acutance dyes which absorb in the visible region of the spectrum are usually required to become colourless during processing of the photographic material, either by washing out or chemical reaction in wet processing techniques or thermal bleaching during heat processing techniques. Cyanine dyes are well known in the photographic art and are extensively used as spectral sensitisers for silver halide based materials. Cyanine dyes are not usually used or considered suitable for antihalation or acutance purposes owing to their limited solubility in aqueous media and especially to their inability to decolourise completely during photographic processing when present in large quantities.

Since the human eye is insensitive to near infrared radiation, coatings of dyes which absorb only at wavelengths longer than 700 nm appear colourless and would therefore be acceptable in photographic materials without any change in absorption during processing. Dyes of this type would be suitable as antihalation and acutance dyes in infrared sensitive photographic elements. Heptamethine and longer chain cyanine dyes are known which have absorption maxima in the near infrared region of the spectrum. However, simple near infrared absorbing cyanine dyes exhibit an absorption curve which is broadened on the short wavelength side and extends well into the visible region of the spectrum (see, for example, A. Weissberger and E. C. Taylor, Special Topics in Heterocyclic Chemistry, John Wiley and Sons, 1977, page 504). This extended absorption curve into the visible results in an objectionably high blue or green appearance which does not disappear during photographic processing.

It is an object of the invention to provide a class of dyes which are capable of forming coatings which absorb in the near infrared and have a relatively low visible absorption, whilst retaining a very high extinction coefficient at the absorption maximum.

SUMMARY OF THE INVENTION

Therefore, according to the present invention there is provided a photographic element comprising one or more photosensitive layers and, as an antihalation or acutance dye, an antihalation or acutance effective amount of one or more compounds of the formula:

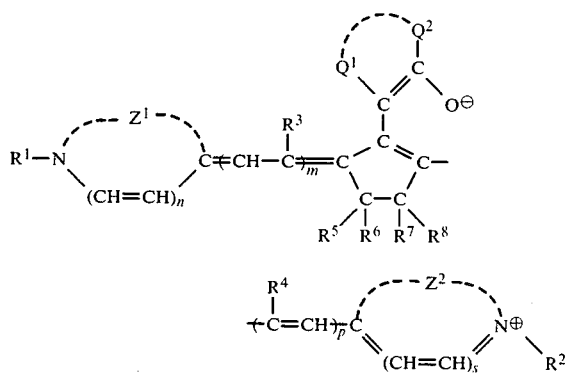

in which:

m+p=2, preferably m=p=1, n is 0 or 1, s is 0 or 1, $Z^1$ and $Z^2$ independently represent the non-metallic atoms necessary to complete a heterocyclic nucleus of the type present in cyanine dyes, $R^1$ and $R^2$ independently represent an alkyl, substituted alkyl, alkenyl, substituted alkenyl or aralkyl group of up to 20 carbon atoms, $R^3$ and $R^4$ independently represent a hydrogen atom or an alkyl, substituted alkyl, alkenyl or substituted alkenyl group of up to 10 carbon atoms, $R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, or one of $R^5$ and $R^6$ together with one of $R^7$ and $R^8$ represent the necessary atoms to complete a carbocyclic ring (e.g. a benzene ring) in which case the others of $R^5$ to $R^8$ are absent, $Q^1$ and $Q^2$ together represent the non-metallic atoms necessary to complete an acidic nucleus of the type present in oxonol or merocyanine dyes.

The heterocyclic nuclei formed by $Z^1$ and $Z^2$ may be any of the wide range of nuclei known in the cyanine dye art. Generally, $Z^1$ and $Z^2$ each represent the non-metallic atoms necessary to complete a heterocyclic nucleus containing 5 to 6 atoms in the heterocyclic ring, the nucleus optionally possessing substituents. Preferably, the heterocyclic ring is composed of ring atoms selected from C, N, O, S and Se. Examples of such heterocyclic nuclei include:

the thiazole series, e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, the benzothiazole series, e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, the naphthothiazole series, e.g. naphtho[1,2]-thiazole, naphtho[2,1]thiazole, 5-methoxynaphtho-[2,1]-thiazole, 5-ethoxynaphtho[2,1]thiazole, 8-methoxynaphtho[1,2]thiazole, 7-methoxynaphtho[1,2]-thiazole, the thianaphtheno-7',6',4,5-thiazole series, e.g. 4'-methoxythianaphtheno-7',6',4,5,-thiazole, the oxazole series, e.g. 4-methyloxazole, 5-methyloxazole, 4-phenyloxazole, 4,5-diphenyloxazole, 4-ethyloxazole, 4,5-dimethyloxazole, 5-phenyloxazole, the benzoxazole series, e.g. benzoxazole, 5-chlorobenzoxazole, 5-methylbenzoxazole, 5-phenylbenzoxazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, the naphthoxazole series, e.g. naphtho[1,2]oxazole, naphtho[2,1]oxazole, the selenazole series, e.g. 4-methylselenazole, 4-phenylselenazole, the benzoselenazole series, e.g. benzoselenazole, 5-chlorobenzoselenazole, 5-methylbenzoselenazole, 5-methoxybenzoselenazole, 5-hydroxybenzoselenazole, tetrahydrobenzoselenazole, the naphthoselenazole series, e.g. naphtho[1,2-]selenazole, naphtho[2,1]selenazole, the thiazoline series, e.g. thiazoline, 4-methylthiazoline, the 2-quinoline series, e.g. quinoline, 3-methylquinoline, 5-methylquinoline, 7-methylquinoline, 8-methylquinoline, 6-chloroquinoline, 8-chloroquinoline, 6-methoxy-quinoline, 6-ethoxyquinoline, 6-hydroxyquinoline, 8-hydroquinoline, the 4-quinoline series, e.g. quinoline, 6-methoxyquinoline, 7-methylquinoline, 8-methylquinoline, the 1-isoquinoline series, e.g. isoquinoline, 3,4-dihydroisoquinoline, the 3-isoquinoline series, e.g. isoquinoline, the benzimidazole series, e.g. 1,3-diethylbenzimidazole, 1-ethyl-3-phenylbenzimidazole, the 3,3-dialkylindolenine series, e.g. 3,3-dimethylindolenine, 3,3,5-trimethylindolenine, 3,3,7-trimethylindolenine, the 2-pyridine series, e.g. pyridine, 5-methylpyridine, and the 4-pyridine series, e.g. pyridine.

Preferably $Z^1$ and/or $Z^2$ complete a benzothiazole nucleus or a 3,3-dialkylindolenine nucleus.

Preferably the groups $R^1$ and $R^2$ contain less than 8 carbon atoms. More preferably $R^1$ and $R^2$ are lower alkyl groups containing up to 4 carbon atoms. The alkyl groups may contain any substituent which does not deleteriously effect the properties of the dye as known in the cyanine art. Suitable substituted alkyl groups include alkoxy-alkyl, benzyl and carboxy-alkyl.

Preferably $R^3$ and $R^4$ represent a hydrogen atom or a lower alkyl group containing 1 to 4 carbon atoms.

Preferably $R^5$ to $R^8$ are hydrogen. However, certain substituted cyclopentanones are commerically available which may be used as intermediates in the preparation of the dyes of formula (I), e.g. 3-methyl-cyclopentanone and 3-phenylcyclopentanone and accordingly one of $R^5$ to $R^8$ may readily represent these substituents.

The cyclic acid nuclei completed by the groups $Q^1$ and $Q^2$ preferably have the ring atoms selected from C, S, N, O and Se. Suitable moieties are derived from the following nuclei which may additionally possess substituents: 1,3-indandione, pyrazolone, isoxazolone, e.g. 3-phenylisoxazolone, oxindole, 2,4,6-trioxohexahydropyrimidine, 2-thio-4,6-dioxohexahydropyrimidine, 3,5-pyrazolidinedione, 2(3H)-imidazole[1,2-a]pyridone, 5,7-dioxo-6,7-dihydro-5-thiazolo[3,2-a]pyrimidine, 2-thio-2,4-oxazolidinedione, thianaphthenonedioxide, 2-thio-2,4-thiazolidinedione, 2,4-thiazolidinedione, thiazolidione, 4-thiazolinone, 2-imino-2,4-oxazolinone, 2,4-imidazolinedione, 2-thio-2,4-imidazolinedione, 5,5-dialkyl-1,3-cyclohexanedione including 5,5-dimethyl-1,3-cyclohexanedione (dimedone) and isopropylidine malonate (Meldrum's acid).

A preferred cyclic nucleus completed by $Q^1$ and $Q^2$ has the general formula:

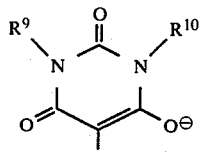

in which:

$R^9$ and $R^{10}$ independently represent a hydrogen atom, an alkyl or cycloalkyl group which may be substituted, e.g. hydroxyalkyl, alkoxy-alkyl, alkoxycarbonyl, polyoxyalkyl; alkenyl or substituted alkenyl, an aryl group which may be substituted, or an aralkyl group, any of which groups may contain up to 25 carbon atoms. Preferably $R^9$ and $R^{10}$ together contain at least 8 carbon atoms and are aliphatic groups, more preferably at least one of $R^9$ and $R^{10}$ represents an alkyl group containing at least 8 carbon atoms.

The dyes of formula (I) absorb in the near infrared having a very low visible absorption whilst retaining a high extinction coefficient at the absorption maximum. In general, the dyes of the invention have extinction coefficients at their maximum absorption wavelength (typically 800 nm or higher) of the order of $2.5 \times 10^5$ to $3.0 \times 10^5$. However, at 700 nm the absorption has generally fallen to approximately 10% of this value and at 650 nm the absorption is down to approximately 2% of the value, as measured in methanolic solution.

The dyes may be incorporated into wet processsed photographic or photothermographic elements as acutance dyes according to conventional techniques. The dyes may also be incorporated into antihalation layers according to techniques of the prior art, for example, in the case of wet processed photographic elements, as an antihalation backing layer, an antihalation underlayer or as an overcoat. It is also anticipated that similar nonamethine dyes would be suitable for use as acutance and antihalation dyes.

Some of the dyes of formula (I) are known. A class of dyes overlapping with formula (I) is disclosed in U.S. Patent Specification No. 2,955,939 for sensitisation of silver halide emulsions. There is no disclosure of the use of the dyes as antihalation or acutance dyes nor indication that such dyes would be useful for that purpose. U.S. Patent Specification No. 3,194,805 discloses a class of merocyanine and holopolar dyes containing arylenechain substitution and their use as spectral sensitising dyes. Certain of the specific dyes disclosed therein are within the scope of formula (I). However, there is no disclosure of the use of the dyes as antihalation or acutance dyes nor any indication that the dyes would be suitable for such purposes.

The minimum amount of a dye of formula (I) for use for acutance purposes greatly exceeds the maximum amount of dye used for sensitising purposes. For example, the quantity of sensitising dye used in the emulsions disclosed in U.S. Patent Specification No. 2,955,939 is in the general range 5 to 100, usually 10 to 20 mg per litre of emulsion whereas for acutance purposes in accordance with the invention the dyes would generally be used in the range 200 to 1000 mg per litre of emulsion.

The dyes of formula (I) are generally added to the photographic element in a sufficient amount to provide a transmissive optical density of greater than 0.1 at $\lambda_{max}$ of the dye. Generally, the coating weight of dye which will provide the desired effect is from 0.1 to 1 mg/dm$^2$.

It has been found that dyes of formula (I) in which the moiety completed by $Q^1$ and $Q^2$ contains one or more bulky aliphatic or predominantly aliphatic groups have particular advantages for use in the photographic elements of the invention. Substituents of this type have the benefit of enhancing the solubility and facilitating the colloidal dispersion of the dyes in an aqueous gelatin-surfactant mixture, this being the normal medium for coating silver halide photographic materials. Furthermore, under certain conditions of solvent and binder, dyes of formula (I) not possessing such bulky substituents may on coating and drying, lose some density at the primary near infrared absorption peak and develop a secondary shorter wavelength absorption peak. It has been found that this undesirable phenomenon is inhibited or entirely suppressed by the incorporation of bulky aliphatic groups onto the moiety completed by $Q^1$ and $Q^2$.

When the moiety completed by $Q^1$ and $Q^2$ contains a single bulky aliphatic or predominantly aliphatic group, this group must contain at least 8 and preferably at least 10 carbon atoms. When two aliphatic or predominantly aliphatic groups are present the two groups must together contain at least 8 and preferably at least 10 carbon atoms. Predominantly aliphatic groups refer to groups in which at least half the carbon atoms present are in the form of aliphatic carbon atoms. Aliphatic as used herein includes cycloaliphatic, e.g. cyclohexyl.

Certain compounds of formula (I) containing the bulky substituents described above are new and form the subject of our copending Application of even date which claims compounds of the general formula:

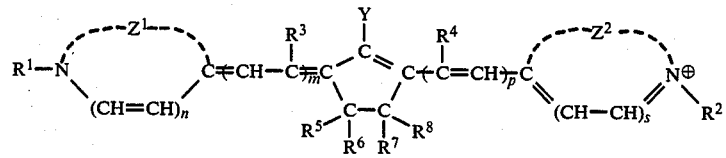

in which $R^1$ to $R^4$, m, p, n, s, $Z^1$ and $Z^2$ are as defined above, $R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, and Y represents

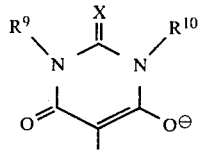

in which:

X represents =O or =S, and $R^9$ and $R^{10}$ independently represent a hydrogen atom, an alkyl group which may be substituted, alkenyl, substituted alkenyl, an aryl group which may be substituted or an aralkyl group, any of which groups may contain up to 25 carbon atoms, with the proviso that Y contains at least one aliphatic or predominantly aliphatic group having at least 8 carbon atoms or two groups which are aliphatic or predominantly aliphatic groups which together have at least 8 carbon atoms.

Preferably, the aliphatic groups are alkyl groups containing at least 8, more preferably at least 10, carbon atoms.

A particularly preferred moiety completed by $Q^1$ and $Q^2$ is that of formula (II) defined above in which at least one of $R^9$ and $R^{10}$ are aliphatic groups of at least 8 carbon atoms or $R^9$ and $R^{10}$ are both aliphatic groups together having at least 8 carbon atoms.

The dyes of formula (I) may be prepared according to the methods described in U.S. Patent Specification No. 2,955,939. The synthesis involves the following stages:

(1) Condensation of an α-ketomethylene compound with a cyclopentanone.

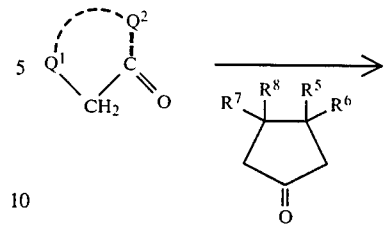

(2) The symmetrical dyes may be prepared by condensation of the cyclopentylidene intermediate with a 2-(acetanilidovinyl) derivative of a quaternized heterocylic base of the type used in cyanine dyes:

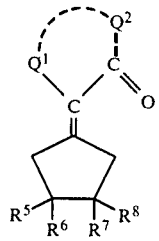

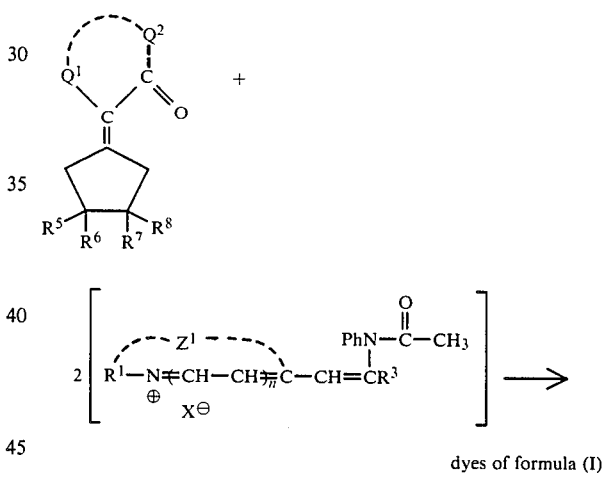

dyes of formula (I)

The assymetrical dyes may be prepared by a related two-step mechanism.

The following Tables I and II report dyes of formula (I) which have been prepared.

TABLE I

Dyes of formula (I) in which $R^3 = R^4 = H$, $R^5 = R^6 = R^7 = R^8 = H$
n = s = 0, m = p = 1.

| Dye No. | $Z^1$ and $Z^2$ complete | $R^1$ | $R^2$ | $Q^1$ and $Q^2$ complete | $\lambda_{max}$ (nm)* |
|---|---|---|---|---|---|
| 1 | benzothiazole | $C_2H_5$ | $C_2H_5$ | 1,3-indandione | 795 |
| 2 | benzothiazole | $C_2H_5$ | $C_2H_5$ | 1,3-diethyl-2-thio-4,6-dioxohexahydropyrimidine | 809 |
| 3 | benzothiazole | $C_2H_5$ | $C_2H_5$ | 3-phenylisoxazolone | 790 |
| 4 | benzothiazole | $C_2H_5$ | $C_2H_5$ | thianaphthenone dioxide | 734 |
| 5 | benzothiazole | $CH_3O(CH_2)_2$ | | 1,3-diethyl-2,4,6-trioxo-hexahydro-pyrimidine | 826 |
| 6 | 5-methyl-benzoselenazole | $C_2H_5$ | $C_2H_5$ | 1,3-diethyl-2,4,6-trioxo-hexahydro-pyrimidine | 823 |
| 7 | benzothiazole | $C_2H_5$ | $C_2H_5$ | 2,2-dimethyl-4:6-diketo-1:3-dioxan | 806 |
| 8 | benzothiazole | $C_2H_5$ | $C_2H_5$ | 5,5-dimethyl-1,3-cyclohexane-dione | 803 |
| 9 | 3,3-dimethylindolenine | $CH_3$ | $CH_3$ | 1-dodecyl-3-ethyl-2,4,6-trioxo-hexahydropyrimidine | 773 |

TABLE I-continued

Dyes of formula (I) in which $R^3 = R^4 = H$, $R^5 = R^6 = R^7 = R^8 = H$
$n = s = 0$, $m = p = 1$.

| Dye No. | $Z^1$ and $Z^2$ complete | $R^1$ | $R^2$ | $Q^1$ and $Q^2$ complete | $\lambda_{max}$ (nm)* |
|---|---|---|---|---|---|
| 10 | 3,3-dimethylindolenine | $CH_3$ | $CH_3$ | 1,3-dioctyl-2,4,6-tri-oxo-hexahydropyrimidine | 774 |
| 11 | benzothiazole | $C_2H_5$ | $C_2H_5$ | 1-allyl-3-dodecyl-2-thio-4,6-dioxo-hexahydro-pyrimidine | 814 |
| 12 | benzothiazole | $C_2H_5$ | $C_2H_5$ | 1,2-diphenyl-3,5-pyrazolidine-dione | 793 |
| 13 | benzothiazole | $C_2H_5$ | $C_2H_5$ | 2,2-tetramethylene-4,6-diketo-1,3-dioxan | 810 |
| 14 | benzothiazole | $C_2H_5$ | $C_2H_5$ | 2-dimethylamino-4,6-dioxo-hexahydropyrimidine | 808 |
| 15 | benzothiazole | $C_2H_5$ | $C_2H_5$ | 1-methyl-3,5-pyrazolidinedione | 789 |
| 16 | benzothiazole | $C_2H_5$ | $C_2H_5$ | 1-phenyl-3,5-pyrazolidinedione | 791 |
| 17 | benzothiazole | $C_2H_5$ | $C_2H_5$ | 1-methoxycarbonyl-3,5-pyrazolidine-dione | 799 |
| 18 | benzothiazole | $C_2H_5$ | $C_2H_5$ | coumarin | 813 |
| 19 | benzothiazole | $C_2H_5$ | $C_2H_5$ | 1,2-dibenzyl-3,5-pyrazolidinedione | 795 |
| 20 | benzothiazole | $C_2H_5$ | $C_2H_5$ | 2-H—pyrido[1,2a]-8-methyl pyrimidine-2,4-(3H)—dione | 825 |
| 21 | 3,3-dimethylindolenine | $CH_3$ | $CH_3$ | 1-phenyl-3,5-pyrazolidinedione | 751 |
| 22 | 3,3-dimethylindolenine | $CH_3$ | $CH_3$ | 2-H—pyrido[1,2a]-8-methyl pyrimidine-2,4-(3H)—dione | 791 |

*Measured in 90% MeOH, 10% $CHCl_3$

TABLE II

Dyes of formula (I) in which $R^1 = R^2 = C_2H_5$, $R^3 = R^4 = H$,
$R^5 = R^6 = R^7 = R^8 = H$, $n = s = 0$, $m = p = 1$.

$Q^1$ and $Q^2$ complete $$\begin{array}{c} R^9 \diagdown \underset{N}{} \overset{\overset{O}{\|}}{\underset{}{C}} \underset{N}{} \diagup R^{10} \\ O = \phantom{xx} = O^{\ominus} \end{array}$$

| Dye No. | $Z^1$ and $Z^2$ complete | $R^9$ | $R^{10}$ | $\lambda_{max}$ (nm)* |
|---|---|---|---|---|
| 23 | benzothiazole | $C_2H_5$ | $C_2H_5$ | 807 |
| 24 | benzothiazole | $CH_3$ | $CH_3$ | 816 |
| 25 | benzothiazole | n-$C_4H_9$ | n-$C_4H_9$ | 817 |
| 26 | benzothiazole | $CH_3O(CH_2)_2$ | $C_2H_5$ | 818 |
| 27 | benzothiazole | cyclohexyl | cyclohexyl | 818 |
| 28 | benzothiazole | benzyl | benzyl | 817 |
| 29 | benzothiazole | $C_{12}H_{25}$ | $C_2H_5$ | 822 |
| 30 | benzothiazole | $CH_3O(CH_2)_2$ | $CH_3O(CH_2)_2$ | 817 |
| 31 | benzothiazole | $C_{12}H_{25}$ | $C_{12}H_{25}$ | 820 |
| 32 | benzothiazole | $C_{12}H_{25}$ | $CH_3$ | 819 |
| 33 | benzothiazole | $C_{18}H_{37}$ | $CH_3$ | 818 |
| 34 | benzothiazole | $C_{12}H_{25}$ | $C_3H_7$ | 806 |
| 35 | benzothiazole | $C_{12}H_{25}$ | H | 807 |
| 36 | benzothiazole | t-$C_4H_9$ | t-$C_4H_9$ | 803 |
| 37 | benzothiazole | $C_3H_7$ | $HO(CH_2)_2$ | 812 |
| 38 | benzothiazole | $C_3H_7$ | $C_{18}H_{37}$ | 809 |
| 39 | benzothiazole | $C_8H_{17}$ | $C_8H_{17}$ | 807 |
| 40 | benzothiazole | $C_6H_5$ | $C_{12}H_{25}$ | 810 |
| 41 | benzothiazole | $C_{18}H_{37}$ | $C_2H_5$ | 807 |
| 42 | benzothiazole | $C_3H_7$ | $C_2H_5O.COCH_2$ | 807 |
| 43 | benzothiazole | $C_6H_5$ | $C_8H_{17}$ | 808 |
| 44 | benzoxazole | $C_2H_5$ | $C_2H_5$ | 730 |
| 45 | benzothiazole | $C_{18}H_{37}$ | $C_6H_5$ | 817 |
| 46** | benzothiazole | $C_2H_5$ | $C_{12}H_{25}$ | 804 |

*Measured in 90% MeOH, 10% $CHCl_3$
**$R^8 = CH_3$

The invention will now be illustrated by the following Examples.

EXAMPLE 1

Preparation of Dye No. 29 (Table II)

(a) Preparation of 1-dodecyl-3-ethylurea

Dodecylamine (370 g) was placed in 80/100° fraction petroleum ether (1.5 litre) and stirred in a flask fitted with a dipping thermometer, tap funnel and reflux condenser. A mixture of ethyl isocyanate (142 g) and petroleum ether (150 ml) was run in slowly whilst external cooling was applied to the flask. The temperature was allowed to reach but not exceed 50° C. The mixture was stirred for 1 hour after the addition was complete, maintaining the temperature at about 50° C. The reaction was then allowed to cool and the copious white precipitate (which had begun to separate as soon as the isocyanate addition commenced) was filtered off, pressed well and washed with about 300 ml petroleum ether. The white mass was dried in vacuum at 50° C. to give a quantitative yield (512 g) with a melting point of 84° to 87° C. The product was not subjected to any further purification before use.

(b) Preparation of 1-dodecyl-3-ethyl-2,4,6-trioxohexahydropyrimidine

The synthesis was carried out according to the method of Clark-Lewis and Thompson, J.C.S. 1959, p.1628. Experience with many syntheses of this type confirmed the importance of correct timing and temperature control.

Since the compounds carry a long chain alkyl group it was necessary to employ double the amount of acetic acid specified in the literature receipe as solvent for the reaction. For the same reason light petroleum makes an excellent solvent from which the product may be recrystallised if desired. 1-dodecyl-3-ethyl-urea (512 g) and malonic acid (225 g) were placed in acetic acid (660 ml). The mixture was stirred and heated in a water bath to 65° to 70° C. This temperature was maintained over three hours in which acetic anhydride (660 ml) was added. After a further 0.5 hour stirring at 70° C. the temperature was raised and held at 90° C. for 3.5 hours.

The mixture was then cooled and acetic acid and excess acetic anhydride evaporated under reduced pressure (20 mm Hg). The residue solidified on standing and was used for the next stage without further purification.

(c) Preparation of 5-cyclopentylidene-1-dodecyl-3-ethyl-2,4,6-trioxo-hexahydropyrimidine This stage was successfully carried out by the method of U.S. Patent Specification No. 2,882,159, Example 9.

A mixture of 1-dodecyl-3-ethyl-2,4,6-trioxohexahydropyrimidine (32.4 g), cyclopentanone (8.4 g), ammonium acetate (2.4 g), acetic acid (4.0 ml) and chloroform (100 ml) was mixed and heated under reflux in an apparatus fitted with a water separator between the reaction flask and condenser. The reflux was maintained for six hours, water separating. The chloroform solution was washed with three portions of water and then evaporated to dryness. The residue was taken up in hot ethanol (approx. 100 ml) from which the product was crystallised as a cream coloured solid (27.2 g) exhibiting a melting point of 38° to 40° C.

(d) Preparation of Dye No. 29

5-cyclopentylidene-1-dodecyl-3-ethyl-2,4,6-trioxo-hexahydropyrimidine (9.8 g, 0.025 mole), 2-acetanilidovinyl-3-ethyl-benzothiazolium iodide (22.4 g, 0.05 mole) and ethanol (300 ml) were mixed and heated to partially dissolve the reactants and triethylamine (14.0 ml) added. Heating at reflux continued for 30 minutes. An initial blue colour developed, but was displaced by the magenta of a by-product as the reaction proceeded. The reaction mixture was kept cold (below 5° C.) overnight and then filtered off and washed free of mother liquor with ethanol. At this stage, the magenta impurity tends to mask the presence of the product. The crude material (14.0 g) was crystallised from methanol (approx. 5 liters) and collected on a filter, where it was carefully washed with more methanol to remove the last traces of the magneta impurity. The yield was 9.6 g and the product melted at 243° C. with decomposition. Concentration of the filtrate gave a further 1.3 g of product with the same quality.

The properties of the intermediates and dye in the above synthesis are reported in Table III.

EXAMPLE 2

Preparation of Dye No. 33 (Table II)

The dye was prepared according to the procedures of Example 1 starting from octadecylamine and isocyanatomethane.

The properties of the intermediates and dye in the above synthesis are reported in Table III.

TABLE III

Properties of Dye Nos. 29 and 33 and the intermediates in their synthesis

| Dye No. | $R^9$ | $R^{10}$ | urea Yield % | urea melting point °C. | 2,4,6-trioxo-hexa-hydropyrimidine Yield % | 2,4,6-trioxo-hexa-hydropyrimidine melting point °C. | 5-cyclopentylidene-2,4,6-trioxo-hexa-hydropyrimidine Yield % | 5-cyclopentylidene-2,4,6-trioxo-hexa-hydropyrimidine melting point °C. | dye Yield % | dye $\epsilon_{at}^2 \lambda_{max}$ | dye $\lambda_{max}^1$ nm | dye melting point °C. |
|---|---|---|---|---|---|---|---|---|---|---|---|---|
| 29 | $C_2H_5$ | $C_{12}H_{25}$ | 100 | 84–87 | 93 | 45–48 | 70 | 38–40 | 50 | $2.7 \times 10^5$ | 822 | 243(d) |
| 33 | $CH_3$ | $C_{18}H_{37}$ | 94 | 103 | 79 | 67 | 78 | 76 | 28 | $2.7 \times 10^5$ | 818 | — |

[1]Measured in 90% MeOH, 10% CHCl₃
[2]The absorbance falls to about 10% of its $\lambda_{max}$ value at 700 nm to about 2% of its $\lambda_{max}$ value at 650 nm.

EXAMPLE 3

Dye (0.04 g) was dissolved in 2-propanol (20 ml) at 60° C. the dye solution was added with rapid stirring to a 6% solution of gelatin (72 ml) containing sodium dioctyl sulphosuccinate (0.25 g) as surfactant at 60° C. Formaldehyde (2 ml, 4%) was added to the mixture. The dye-gelatin mixture was coated at 0.8 cm³ per square decimetre onto subbed polyester base and dried. The characteristics of the dye-gelatin coatings are reported in the following Table V.

TABLE IV

| Dye No. | Density of coating at absorption max. | Wavelength of absorption max. of coating (nm) | Average optical density of coating between 600–700 nm | Ratio of near I.R. max.absorbance to 600–700 nm average absorbance | Remarks |
|---|---|---|---|---|---|
| 6 | — | — | — | — | Near I.R. absorption is completely lost on diluting with water. |
| 7 | — | — | — | — | Near I.R. absorption is completely lost on diluting with water. |
| 8 | 0.24 | 1130 | 0.1 | 2.4 | — |
| 9 | 0.30 | 1000 | 0.1 | 3.0 | — |
| 10 | 0.37 | 1000 | 0.085 | 4.3 | — |
| 23 | — | — | — | — | Near I.R. absorption is completely lost on diluting with water. |
| 26 | 0.5 | 875 | 0.15 | 3.3 | — |
| 29 | 0.48 | 870 | 0.11 | 4.3 | — |
| 32 | 0.34 | 890 | 0.11 | 4.8 | — |
| 33 | 0.31 | 870 | 0.07 | 4.4 | — |
| 34 | 0.38 | 880 | 0.065 | 5.8 | — |
| 35 | 0.18 | 1000 | 0.09 | 2.0 | — |
| 36 | — | — | — | — | Near I.R. absorption is completely lost on diluting with water. |
| 38 | 0.62 | 880 | 0.11 | 5.6 | — |
| 39 | 0.50 | 890 | 0.09 | 5.5 | — |

TABLE IV-continued

| Dye No. | Density of coating at absorption max. | Wavelength of absorption max. of coating (nm) | Average optical density of coating between 600-700 nm | Ratio of near I.R. max.absorbance to 600-700 nm average absorbance | Remarks |
|---|---|---|---|---|---|
| 40 | 0.35 | 890 | 0.07 | 5.0 | |
| 41 | 0.29 | 880 | 0.06 | 4.8 | |
| 42 | 0.16 | 890 | 0.05 | 3.2 | |
| 44 | — | — | — | — | Near I.R. absorption is completely lost on diluting with water. |

The results listed in Table V show that those dyes which contain a bulky aliphatic group as part of the moiety completed by $Q^1$ and $Q^2$ offer particular advantages when the coating is made from a predominantly aqueous solution. In particular, the loss of the near infrared absorption peak which occurs on diluting of alcoholic solutions of some dyes (e.g. Dyes 6, 7, 23, 36 and 44) with water is not observed for analogous dyes which contain a bulky aliphatic group. This loss of near infrared absorption is probably due to conformational changes in the dye molecule which are inhibited by the presence of the bulky aliphatic groups.

The ratios of near infrared maximum absorbance of the dye coatings to the average absorbance between 600 and 700 nm, which are quoted in Table V, provide a measure of the effectiveness of the dyes for antihalation coatings in which the two main requirements are: high near infrared density, and low visible blue colouration (i.e. low average absorbance between 600 and 700 nm). It can be seen than the highest values of this ratio were measured on coatings made from dyes possessing bulky aliphatic groups in the moiety completed by $Q^1$ and $Q^2$.

Even those compounds such as Dyes 6, 7, 23, 36 and 44 which are not suitable for coating from aqueous solutions, are still satisfactory for the preparation of near infrared absorbing antihalation layers coated from organic solvents.

EXAMPLE 4

Dye 23 (0.01 g) was dissolved in chloroform (2 ml) and added to a solution of polyvinylbutyral polymer (1 g) in butan-2-one (10 ml). The resulting solution was coated at a wet thickness of 75 μm onto polyester base and dried. The resulting coating, suitable as an antihalation layer for infrared sensitive photothermographic materials was colourless in visual appearance but exhibited an optical absorption of 0.3 at 845 nm.

EXAMPLE 5

A 2% iodobromide emulsion was prepared by balanced double jet emulsification to give cubic grains of 0.16 micron mean edge length. The emulsion was conventionally sulphur and gold sensitised. The emulsion was spectrally sensitised to the near infrared by the addition of 13 mg of 3,3'-diethylthia-tricarbocyanine iodide as a 0.04% solution in methanol per mole of silver.

The emulsion was split into 9 portions which were coated as follows:
(1) on clear polyester base,
(2) on polyester base coated (same side) with Dye 29, as in Example 3,
(3) on polyester base coated (same side) with Dye 32, as in Example 3,
(4) on polyester base coated (same side) with Dye 33, as in Example 3,
(5) on polyester base coated (same side) with Dye 34, as in Example 3,
(6) on polyester base coated (reverse side) with Dye 29, as in Example 3,
(7) on polyester base coated (reverse side) with Dye 32, as in Example 3,
(8) on polyester base coated (reverse side) with Dye 33, as in Example 3,
(9) on polyester base coated (reverse side) with Dye 34, as in Example 3.

The nine coatings were imaged with near infrared light focussed from a test target consisting of an array of fine lines using near infrared light from a 500 W tungsten bulb filtered with a Kodak Wratten No. 88A filter. The exposed samples were developed and fixed using conventional black and white processing solutions.

The image thus recorded on Sample (1) clear base showed considerable blurring and spreading of the edges of the lines due to halation effects. In contrast the images recorded on Samples (2) to (9) (antihalation underlayers and backings) displayed clear sharp edged lines.

The images recorded on Samples (2) to (9) showed only a very slight blue colouration in the background.

EXAMPLE 6

Dye 29 (15 mg) was dissolved with warming in methanol (15 ml) and added with stirring to 10% ethylcellulose in 2-butanone (30 ml). The solution was coated at a wet thickness of 65 μm onto unsubbed polyester base and dried. The layer, which had a faint blue visible appearance, had a peak infrared absorption of 0.38 at 815 nm.

Dye 8, coated in the same way, had a peak absorption of 0.24 at 812 nm.

EXAMPLE 7

A chlorobromide emulsion (64% chloride) was prepared by balanced double jet emulsification to give cubic grains of 0.28 micron mean edge length. This emulsion was conventionally sulphur and gold sensitised, and spectrally sensitised to near infrared radiation from 700 to 850 nm.

Coatings were made on:
(1) clear polyester base,
(2) polyester base coated on the reverse side with Dye 33 in gelatin as in Example 3.
(3) polyester base coated on the reverse side with a dense layer of carbon black in gelatin, effectively totally absorptive to infrared light.

These coatings were imaged to infrared light by focussing the output of a laser diode at 815 nm into a line of width approximately 100 μm at the emulsion surface of the film. The duration and intensity of the exposure was chosen so as to give, on processing the samples in conventional black and white developing and fixing solutions, a line image of which the central density just reached the maximum (optical density of 3.5 above base + fog) obtainable on the emulsion layer used. The density profile across this line image was then recorded using a microdensitometer, and the width of the line measured at densities of 0.5 and 1.0 above base + fog, thus giving a direct evaluation of line spread due to halation.

Table V shows the heavy halation in the unbacked Sample 1 and the diminished halation in Sample 2, backed with Dye 33, both compared with Sample 3 in which halation is absent.

TABLE V

| Sample | Backing | Width of imaged line at | |
|---|---|---|---|
| | | O.D. = 0.5 | O.D. = 1.0 |
| 1 | none | >1.0 mm | 0.80 mm |
| 2 | Dye 33 | 0.28 mm | 0.19 mm |
| 3 | dense carbon black | 0.19 mm | 0.16 mm |

EXAMPLE 8

A conventional silver behenate (thermally developed silver) preparation, e.g. as disclosed in British Patent Specification No. 1 565 593, was spectrally sensitised to near infrared radiation and coated as follows:

(1) on clear polyester base,
(2) on polyester base having a backing of Dye 33 in gelatin, as in Example 3,
(3) on polyester base having a backing of Dye 8 in ethylcellulose, as in Example 6,
(4) on polyester base having a backing of Dye 29 in ethylcellulose, as in Example 6,
(5) on polyester base having a backing of dense carbon black in gelatin.

The coatings were each imaged with the same amount of exposure from a single narrow line of infrared light at 815 nm (as used in Example 7). Processing was by heating for 10 s on a drum at 125° C., and gave image lines of peak density 1.1–1.2 above base + fog. The density profile across the lines was measured with a microdensitometer, and line widths at densities of 0.3 and 0.5 above base + fog obtained, giving a direct measure of image spread due to halation.

Table VI shows the severe halation occuring on the unbacked Sample 1, and the reduction of halation using the dye backed Samples 2 to 4, all compared with the halation-free Sample 5.

TABLE VI

| Sample | Backing | Binder | Width (mm) of imaged line at O.D. above base + fog = | |
|---|---|---|---|---|
| | | | 0.3 | 0.5 |
| 1 | none | | 11.0 | 5.0 |
| 2 | dye 33 | gelatin | 1.5 | 0.8 |
| 3 | dye 8 | ethylcellulose | 1.7 | 0.8 |
| 4 | dye 29 | ethylcellulose | 1.5 | 0.8 |
| 5 | dense carbon black | gelatin | 1.0 | 0.5 |

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

We claim:

1. A photographic element comprising one or more silver halide photosensitive layers on a substrate, characterized in that the element includes in at least one layer free of silver halide as an antihalation dye, an antihalation effective amount of at least one compound that will provide a transmissive optical density of greater than 0.1 at the λmax of the compound, said compound having the formula:

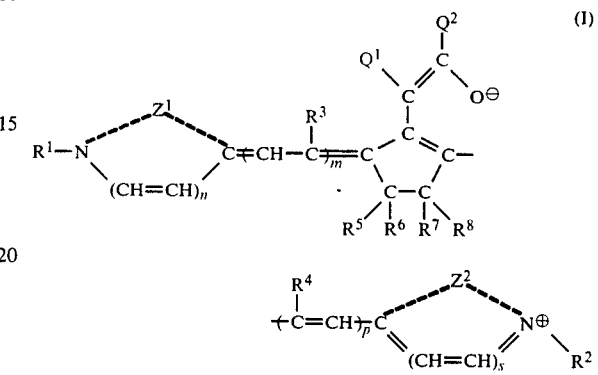

in which:
m+p=2,
n is 0 or 1,
s is 0 or 1,
$Z^1$ and $Z^2$ independently represent the non-metallic atoms necessary to complete a heterocyclic nucleus of the type present in cyanine dyes,
$R^1$ and $R^2$ are independently selected from the group consisting of alkyl or substituted alkyl, alkenyl, substituted alkenyl or aralkyl, each group containing not more than 20 carbon atoms,
$R^3$ and $R^4$ are independently selected from the group consisting of a hydrogen atom or an alkyl, substituted alkyl, alkenyl or substituted alkenyl each of which groups contain not more than 10 carbon atoms,
$R^5$, $R^6$, $R^7$ and $R^8$, which together may not contain more than 12 carbon atoms, are independently selected from the group consisting of a hydrogen atom, an alkyl, substituted alkyl, alkenyl, substituted alkenyl, aryl or alkaryl group, or one of $R^5$ and $R^6$ together with one of $R^7$ and $R^8$ represent the necessary atoms to complete a carbocyclic ring in which case the others of $R^5$ to $R^8$ are absent,
$Q^1$ and $Q^2$ together represent the non-metallic atoms necessary to complete an acidic nucleus of the type present in oxonol or merocyanine dyes.

2. A photographic element as claimed in claim 1, characterised in that $Z^1$ and $Z^2$ complete a 5 or 6 membered heterocyclic nucleus which may possess substituents.

3. A photographic element as claimed in claim 2, characterised in that $Z^1$ and/or $Z^2$ complete a heterocyclic nucleus selected from the group consisting of thiazole, benzothiazole, naphthothiazole, thianaphtheno-7'-6',4,5-thiazole, oxazole, benzoxazole, naphthoxazole, selenazole, benzoselenazole, naphthoselenazole, thiazoline, 2-quinoline, 4-quinoline, 1-isoquinoline, 3-isoquinoline, benzimidazole, 3,3-dialkylindolenine, 2-pyridine, and 4-pyridine, each of which nuclei may be substituted.

4. A photographic element as claimed in claim 1, characterised in that $Z^1$ and/or $Z^2$ complete a benzothiazole or a 3,3-dialkylindolenine nucleus.

5. A photographic element as claimed in claim 1, characterised in that $Q^1$ and $Q^2$ complete a moiety which is a derivative of one of the nuclei which may optionally possess substituents selected from the group consisting of indandione, pyrazolone, isoxazolone, oxindole, 2,4,6-trioxohexahydropyrimidine, 2-thio-4,6-dioxohexahydropyrimidine, 3:5-pyrazolidinedione, 2(3H)-imidazo[1,2-a]pyridone, 5,7-dioxo-6,7-dihydro-5-thiazolo[3,2-a]pyrimidine, 2-thio-2,4-oxazolidin-dione, thianaphthenone dioxide, 2-thio-2,4-thiazolidindione, 4-thiazolinone, 2-imino-2,4-oxazolinone, 2,4-imidazolinedione, 2-thio-2,4-imindazolinedione cyclic groups, 5,5-dialkyl-1,3-cyclohexanedione or isopropylidine malonate.

6. A photographic element as claimed in claim 5, characterised in that the moiety completed by $Q^1$ and $Q^2$ contains at least one aliphatic or predominantly aliphatic group having at least 8 carbon atoms.

7. A photographic element as claimed in claim 6, characterised in that the moiety completed by $Q^1$ and $Q^2$ contains two groups which are aliphatic or predominantly aliphatic groups which together have at least 8 carbon atoms.

8. A photographic element as claimed in claim 5, characterised in that $Q^1$ and $Q^2$ complete a moiety of the general formula:

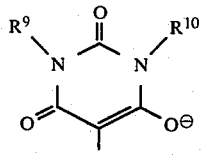

in which:
$R^9$ and $R^{10}$ are independently selected from the group consisting of a hydrogen atom, an alkyl group which may be substituted, alkenyl, substituted alkenyl, an aryl group which may be substituted or an aralkyl group, each of which groups contain not more than 25 carbon atoms.

9. A photographic element as claimed in claim 8, characterised in that $R^9$ and $R^{10}$ together contain at least 8 carbon atoms.

10. A photographic element as claimed in claim 9, characterised in that at least one of $R^9$ and $R^{10}$ represents a group containing at least 8 carbon atoms.

11. A photographic element as claimed in claim 10, characterised in that at least one of $R^9$ and $R^{10}$ represents an alkyl group having at least 8 carbon atoms.

12. A photographic element as claimed in claim 1, characterised in that $n=s=0$ and $m=p=1$.

13. A photographic element as claimed in claim 1, characterised in that the photographic element is a conventional wet processed photographic element.

14. A photographic element as claimed in claim 1, characterised in that the photographic element is a photothermographic element comprising a silver halide photothermographic element.

15. A photographic element as claimed in claim 1, characterised in that the dye of formula (I) is present in an antihalation backing on said substrate.

16. A photographic element as claimed in claim 1, characterised in that the dye of formula (I) is present as an underlayer between said substrate and said one or more photosensitive layers.

17. A photographic element as claimed in claim 13, characterised in that the dye of formula (I) is present in an overcoat above the photosensitive layer.

18. A photographic element as claimed in claim 1, characterised in that the dye of formula (I) is present in the photosensitive layer.

* * * * *